US011914693B2

(12) United States Patent
Huang et al.

(10) Patent No.: US 11,914,693 B2
(45) Date of Patent: Feb. 27, 2024

(54) FINGERPRINT RECOGNITION METHOD AND APPARATUS, AND TOUCHSCREEN TERMINAL

(71) Applicant: Huawei Technologies Co., Ltd., Shenzhen (CN)

(72) Inventors: Jiejing Huang, Shenzhen (CN); Huangwei Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 351 days.

(21) Appl. No.: 17/335,843

(22) Filed: Jun. 1, 2021

(65) Prior Publication Data

US 2021/0357488 A1 Nov. 18, 2021

Related U.S. Application Data

(63) Continuation of application No. 15/743,779, filed as application No. PCT/CN2015/100297 on Dec. 31, 2015, now Pat. No. 11,036,840.

(51) Int. Cl.
G06F 21/32 (2013.01)
G06V 40/12 (2022.01)
H04L 9/32 (2006.01)

(52) U.S. Cl.
CPC .............. *G06F 21/32* (2013.01); *G06V 40/12* (2022.01); *G06V 40/1365* (2022.01); *H04L 9/3231* (2013.01)

(58) Field of Classification Search
CPC ........ G06F 21/32; G06F 1/3206; G06F 1/325; G06V 40/12; G06V 40/1365; H04L 9/3231
See application file for complete search history.

(56) References Cited

U.S. PATENT DOCUMENTS

| 2004/0139316 A1 | 7/2004 | Kotani |
| 2009/0133117 A1 | 5/2009 | Bentley et al. |
| 2010/0063906 A1 | 3/2010 | Nelsen et al. |
| 2011/0223888 A1* | 9/2011 | Esaki ............... G06F 21/32 455/411 |

(Continued)

FOREIGN PATENT DOCUMENTS

| CN | 103155509 A | 6/2013 |
| CN | 103544422 A | 1/2014 |

(Continued)

OTHER PUBLICATIONS

Blackbird, Biometric-based identification technology, Personal computer, PC Professionell China, Editorial Office, Issue Jan. 2006, with the English Abstract, 8 pages.

*Primary Examiner* — Abiy Getachew
(74) *Attorney, Agent, or Firm* — Conley Rose, P.C.

(57) ABSTRACT

A fingerprint recognition method includes, when a fingerprint authentication module is in a disabled state, receiving a touch operation used to trigger an application program. If fingerprint authentication is not required for execution of the application program, the fingerprint recognition module is kept in a disabled state, and after the application program has been executed for specific duration, the fingerprint authentication module is enabled again, to perform the fingerprint authentication.

20 Claims, 7 Drawing Sheets

(56) References Cited

U.S. PATENT DOCUMENTS

| | | | |
|---|---|---|---|
| 2013/0133055 A1* | 5/2013 | Ali | H04W 12/065 |
| | | | 726/7 |
| 2015/0067348 A1 | 3/2015 | Webber et al. | |
| 2015/0070134 A1 | 3/2015 | Nagisetty et al. | |
| 2015/0294134 A1 | 10/2015 | Giannozzi et al. | |
| 2015/0324570 A1 | 11/2015 | Lee et al. | |
| 2016/0232342 A1* | 8/2016 | Ganguly | G06F 21/36 |
| 2017/0076139 A1 | 3/2017 | Park et al. | |
| 2017/0083694 A1 | 3/2017 | Mardikar et al. | |
| 2017/0364727 A1 | 12/2017 | Yang | |
| 2018/0157893 A1* | 6/2018 | Lee | G06F 21/32 |
| 2018/0349649 A1 | 12/2018 | Martel et al. | |

FOREIGN PATENT DOCUMENTS

| | | |
|---|---|---|
| CN | 104376239 A | 2/2015 |
| CN | 104794433 A | 7/2015 |
| CN | 104978572 A | 10/2015 |
| CN | 105095744 A | 11/2015 |
| CN | 105099676 A | 11/2015 |
| CN | 105117086 A | 12/2015 |
| CN | 105138129 A | 12/2015 |
| CN | 105160230 A | 12/2015 |
| JP | 2006338510 A | 12/2006 |
| KR | 20150060273 A | 6/2015 |

\* cited by examiner

FINGERPRINT RECOGNITION METHOD AND APPARATUS, AND TOUCHSCREEN TERMINAL

CROSS-REFERENCE TO RELATED APPLICATIONS

This application is a continuation of U.S. patent application Ser. No. 15/743,779 filed on Jan. 11, 2018, which is a National Stage of International Patent Application No. PCT/CN2015/100297 filed on Dec. 31, 2015. Both of the aforementioned applications are hereby incorporated by reference in their entireties.

TECHNICAL FIELD

This application relates to the field of intelligent terminal technologies, and in particular, to a fingerprint recognition method and apparatus, and a touchscreen terminal.

BACKGROUND

With rapid development of an electronic industry and popularization of intelligent terminals, a touchscreen terminal is increasingly widely used. To improve security of using a touchscreen terminal, a large quantity of screen fingerprint recognition solutions emerge, and accordingly, a full-screen fingerprint recognition technology gradually becomes mature. In the full-screen fingerprint recognition technology, any position on a screen can be a fingerprint sensing position, so that security and convenience of using the touchscreen terminal are further improved.

However, for a technology application based on full-screen fingerprint recognition, each time a user performs a touch operation on a screen of the touchscreen terminal, the touchscreen terminal needs to determine permission of a fingerprint used to perform the touch operation, that is, performs, by invoking a fingerprint recognition module, a series of processing on the fingerprint used to perform the touch operation, such as detection, collection, recognition, and matching. Therefore, the fingerprint recognition module needs to be always in an enabled state. However, if the fingerprint recognition module is always in an enabled state, a system processing volume is increased. Consequently, a large amount of power of the touchscreen terminal is consumed, and a standby time is reduced.

SUMMARY

Embodiments of this application provide a fingerprint recognition method and apparatus, and a touchscreen terminal, to resolve a prior-art problem that a touchscreen terminal has relatively large power consumption and a relatively short standby time.

According to a first aspect, a fingerprint recognition method is provided, including, if the terminal learns, by means of monitoring when a fingerprint recognition module is disabled, that a touch operation used to trigger an application program is performed on a touchscreen, determining, by the terminal, whether fingerprint authentication is required for execution of the application program, where the fingerprint recognition module is configured to authenticate a fingerprint used to perform the touch operation on the touchscreen; and when determining that the fingerprint authentication is not required for the execution of the application program, processing, by the terminal, the application program while keeping the fingerprint recognition module in a disabled state.

With reference to the first aspect, in a first possible implementation of the first aspect, the method further includes, after the application program has been processed for specified duration, enabling the fingerprint recognition module, to authenticate the fingerprint used to perform the touch operation; and after it is determined that the authentication succeeds, disabling the fingerprint recognition module.

With reference to the first possible implementation of the first aspect, in a second possible implementation of the first aspect, after the fingerprint recognition module is enabled, and before fingerprint recognition is performed, the method further includes, if no fingerprint is collected, keeping, by the terminal, the fingerprint recognition module in an enabled state until a fingerprint is collected.

With reference to any one of the first aspect, or the first or the second possible implementation of the first aspect, in a third possible implementation of the first aspect, the determining, by the terminal, whether fingerprint authentication is required for execution of the application program includes determining, by the terminal according to a security level of the application program, whether the fingerprint authentication is required for the execution of the application program.

With reference to any one of the first aspect, or the first or the second possible implementation of the first aspect, in a fourth possible implementation of the first aspect, the determining, by the terminal, whether fingerprint authentication is required for execution of the application program includes determining, by the terminal according to a parameter carried in a received fingerprint authentication request sent by the application program, whether the fingerprint authentication is required for the execution of the application program.

With reference to the fourth possible implementation of the first aspect, in a fifth possible implementation of the first aspect, the determining, by the terminal, that the fingerprint authentication is not required for the execution of the application program includes determining, by the terminal according to the parameter carried in the received fingerprint authentication request sent by the application program, that the fingerprint authentication is not required for the execution of the application program; or determining, by the terminal, that the fingerprint authentication is not required for the execution of the application program when determining, according to the parameter carried in the received fingerprint authentication request sent by the application program, that the fingerprint authentication is required for the execution of the application program, and that a retained result of latest fingerprint authentication is a success and duration between a moment at which the latest fingerprint authentication is performed and a current moment is in a preset duration range.

With reference to any one of the first aspect, or the first to the fifth possible implementations of the first aspect, in a sixth possible implementation of the first aspect, the method further includes, when determining that the fingerprint authentication is required for the execution of the application program, enabling, by the terminal, the fingerprint recognition module, to authenticate the fingerprint used to perform the touch operation; and after it is determined that the authentication succeeds, processing the application program, and disabling the fingerprint recognition module.

According to a second aspect, a fingerprint recognition apparatus is provided, including a monitoring unit configured to monitor, when a fingerprint recognition module is disabled, a touch operation performed on a touchscreen; a determining unit configured to, if the monitoring unit detects that a touch operation used to trigger an application program is performed on the touchscreen, determine whether fingerprint authentication is required for execution of the application program, where the fingerprint recognition module is configured to authenticate a fingerprint used to perform the touch operation on the touchscreen; and an execution unit configured to, when the determining unit determines that the fingerprint authentication is not required for the execution of the application program, process the application program while keeping the fingerprint recognition module in a disabled state.

With reference to the second aspect, in a first possible implementation of the second aspect, the execution unit is further configured to, after the application program has been processed for specified duration, enable the fingerprint recognition module, to authenticate the fingerprint used to perform the touch operation; and after it is determined that the authentication succeeds, disable the fingerprint recognition module.

With reference to the first possible implementation of the second aspect, in a second possible implementation of the second aspect, the execution unit is configured to, after the fingerprint recognition module is enabled, and before fingerprint recognition is performed, if no fingerprint is collected, the terminal keep the fingerprint recognition module in an enabled state until a fingerprint is collected.

With reference to any one of the second aspect, or the first or the second possible implementation of the second aspect, in a third possible implementation of the second aspect, the determining unit is configured to determine, according to a security level of the application program, whether the fingerprint authentication is required for the execution of the application program.

With reference to any one of the second aspect, or the first or the second possible implementation of the second aspect, in a fourth possible implementation of the second aspect, the determining unit is configured to determine, according to a parameter carried in a received fingerprint authentication request sent by the application program, whether the fingerprint authentication is required for the execution of the application program.

With reference to the fourth possible implementation of the second aspect, in a fifth possible implementation of the second aspect, the determining unit is configured to determine, according to the parameter carried in the received fingerprint authentication request sent by the application program, that the fingerprint authentication is not required for the execution of the application program; or determine that the fingerprint authentication is not required for the execution of the application program when determining, according to the parameter carried in the received fingerprint authentication request sent by the application program, that the fingerprint authentication is required for the execution of the application program, and that a retained result of latest fingerprint authentication is a success and duration between a moment at which the latest fingerprint authentication is performed and a current moment is in a preset duration range.

With reference to any one of the second aspect, or the first to the fifth possible implementations of the second aspect, in a sixth possible implementation of the second aspect, the execution unit is further configured to, when the determining unit determines that the fingerprint authentication is required for the execution of the application program, enable the fingerprint recognition module, to authenticate the fingerprint used to perform the touch operation; and after it is determined that the authentication succeeds, process the application program, and disable the fingerprint recognition module.

According to a third aspect, a fingerprint recognition method is provided, including receiving, by a terminal, a request for first identity authentication, performing the first identity authentication, determining that the first identity authentication succeeds, and recording a first time; when a fingerprint recognition module is in a first operation mode, receiving, by the terminal in a second time, a touch operation used to trigger an application program; and determining, by the terminal according to at least the first time, the second time, and a preset time threshold, whether to switch the fingerprint recognition module from the first operation mode to a second operation mode.

With reference to the third aspect, in a first possible implementation of the third aspect, when the fingerprint recognition module is in the first operation mode, the fingerprint recognition module is in a fully-disabled state, or the fingerprint recognition module is in a half-disabled state, where the fully-disabled state means that the fingerprint recognition module cannot be configured to detect a touch operation, or collect or recognize a fingerprint, and the half-disabled state means that the fingerprint recognition module can be configured to detect a touch operation, but cannot be configured to collect or recognize a fingerprint used to perform a touch operation, or means that the fingerprint recognition module only detects a touch operation, but does not collect or recognize a fingerprint; and the fingerprint recognition module is in the second operation mode when the fingerprint recognition module at least can be configured to detect and recognize a fingerprint used to perform a touch operation.

With reference to the third aspect or the first possible implementation of the third aspect, in a second possible implementation of the third aspect, the determining, by the terminal according to the first time, the second time, and a preset time threshold, whether to switch the fingerprint recognition module from the first operation mode to the second operation mode includes calculating, by the terminal, a time interval between the first time and the second time according to the first time and the second time; comparing the calculated time interval with the preset time threshold; and if the time interval is greater than the preset time threshold, switching the fingerprint recognition module from the first operation mode to the second operation mode; or if the time interval is not greater than the preset time threshold, determining to keep the fingerprint recognition module in the first operation mode.

With reference to the third aspect or the first possible implementation of the third aspect, in a third possible implementation of the third aspect, the method further includes setting, by the terminal, a flag bit used to indicate an authentication success; and in a third time after the first time, marking, by the terminal, the flag bit as a failure, or deleting the flag bit used to indicate an authentication success, where a time interval between the third time and the first time is the preset time threshold.

With reference to the third possible implementation of the third aspect, in a fourth possible implementation of the third aspect, the determining, by the terminal according to the first time, the second time, and a preset time threshold, whether to switch the fingerprint recognition module from the first operation mode to the second operation mode includes, if the terminal determines that the flag bit is marked as a failure, or determines that the flag bit used to indicate an authentication success is deleted, determining, by the terminal in the second time, to switch the fingerprint recognition module from the first operation mode to the second operation mode; or if the terminal determines that there is the flag bit used to indicate an authentication success, determining, by the terminal in the second time, to keep the fingerprint recognition module in the first operation mode.

With reference to the third aspect or the first possible implementation of the third aspect, in a fifth possible implementation of the third aspect, the method further includes setting, by the terminal in the first time, a failure time of a result indicating that the authentication succeeds, where the failure time is set according to the first time and the preset time threshold.

With reference to the fifth possible implementation of the third aspect, in a sixth possible implementation of the third aspect, the determining, by the terminal according to the first time, the second time, and a preset time threshold, whether to switch the fingerprint recognition module from the first operation mode to the second operation mode includes, if the terminal determines that the second time is after the failure time, determining, by the terminal in the second time, to switch the fingerprint recognition module from the first operation mode to the second operation mode; or if the terminal determines that the second time is before the failure time, determining, by the terminal in the second time, to keep the fingerprint recognition module in the first operation mode.

With reference to any one of the third aspect, or the first to the sixth possible implementations of the third aspect, in a seventh possible implementation of the third aspect, the determining, by the terminal according to at least the first time, the second time, and a preset time threshold, whether to switch the fingerprint recognition module from the first operation mode to a second operation mode includes determining, by the terminal according to the first time, the second time, and the preset time threshold and with reference to a preset security level of the application program, an application type of the application program, a parameter carried in a fingerprint authentication request sent by the application program, a use frequency of the application program, an installation time of the application program, or signature information of the application program, whether to switch the fingerprint recognition module from the first operation mode to the second operation mode.

With reference to the first possible implementation of the third aspect, in an eighth possible implementation of the third aspect, if the terminal implements the first identity authentication by authenticating a fingerprint by using the fingerprint recognition module, the terminal switches the fingerprint recognition module from the second operation mode to the first operation mode after the first time.

With reference to any one of the third aspect, or the first to the eighth possible implementations of the third aspect, in a ninth possible implementation of the third aspect, the triggering an application program includes starting the application program, or performing a function in the application program, or switching the application program from a background to a foreground.

With reference to any one of the third aspect, or the first to the ninth possible implementations of the third aspect, in a tenth possible implementation of the third aspect, the method includes, after switching the fingerprint recognition module from the first operation mode to the second operation mode, waiting, by the terminal, to receive a request for second identity authentication, and performing identity authentication after receiving the request for the second identity authentication.

According to a fourth aspect, a fingerprint recognition apparatus applied to a terminal is provided, including a first receiving unit configured to receive a request for first identity authentication; a processing unit configured to perform the first identity authentication after the first receiving unit receives the request for the first identity authentication, determine that the first identity authentication succeeds, and record a first time; a second receiving unit configured to, when a fingerprint recognition module is in a first operation mode, receive, in a second time, a touch operation used to trigger an application program; and a determining module configured to determine, according to at least the first time, the second time, and a preset time threshold, whether to switch the fingerprint recognition module from the first operation mode to a second operation mode. With reference to the fourth aspect, in a first possible implementation of the fourth aspect, the fingerprint recognition module is in the first operation mode when the fingerprint recognition module is in a fully-disabled state, or the fingerprint recognition module is in a half-disabled state, where the fully-disabled state means that the fingerprint recognition module cannot be configured to detect a touch operation, or collect or recognize a fingerprint, and the half-disabled state means that the fingerprint recognition module can be configured to detect a touch operation, but cannot be configured to collect or recognize a fingerprint used to perform a touch operation, or means that the fingerprint recognition module only detects a touch operation, but does not collect or recognize a fingerprint; and the fingerprint recognition module is in the second operation mode when the fingerprint recognition module at least can be configured to detect and recognize a fingerprint used to perform a touch operation.

With reference to the fourth aspect or the first possible implementation of the fourth aspect, in a second possible implementation of the fourth aspect, the determining unit is configured to calculate a time interval between the first time and the second time according to the first time and the second time; compare the calculated time interval with the preset time threshold; and if the time interval is greater than the preset time threshold, determine to switch the fingerprint recognition module from the first operation mode to the second operation mode; or if the time interval is not greater than the preset time threshold, determine to keep the fingerprint recognition module in the first operation mode.

With reference to the fourth aspect or the first possible implementation of the fourth aspect, in a third possible implementation of the fourth aspect, the apparatus further includes a setting unit, where the setting unit is configured to set, in the first time, a flag bit used to indicate an authentication success; and in a third time after the first time, mark the flag bit as a failure, or delete the flag bit used to indicate an authentication success, where a time interval between the third time and the first time is the preset time threshold.

With reference to the third possible implementation of the fourth aspect, in a fourth possible implementation of the fourth aspect, the determining unit is configured to, if it is determined that the flag bit is marked as a failure, or if it is determined that the flag bit used to indicate an authentication success is deleted, determine, in the second time, to switch the fingerprint recognition module from the first operation mode to the second operation mode; or if it is determined that there is the flag bit used to indicate an authentication success, determine, in the second time, to keep the fingerprint recognition module in the first operation mode.

With reference to the fourth aspect or the first possible implementation of the fourth aspect, in a fifth possible implementation of the fourth aspect, the setting unit is further configured to, set, in the first time, a failure time of a result indicating that the authentication succeeds, where the failure time is set according to the first time and the preset time threshold.

With reference to the fifth possible implementation of the fourth aspect, in a sixth possible implementation of the fourth aspect, the determining unit is configured to, if it is determined that the second time is after the failure time, determine, in the second time, to switch the fingerprint recognition module from the first operation mode to the second operation mode; or if it is determined that the second time is before the failure time, determine, in the second time, to keep the fingerprint recognition module in the first operation mode.

With reference to any one of the fourth aspect, or the first to the sixth possible implementations of the fourth aspect, in a seventh possible implementation of the fourth aspect, the determining unit is configured to determine, according to the first time, the second time, and the preset time threshold and with reference to a preset security level of the application program, an application type of the application program, a parameter carried in a fingerprint authentication request sent by the application program, a use frequency of the application program, an installation time of the application program, or signature information of the application program, whether to switch the fingerprint recognition module from the first operation mode to the second operation mode.

With reference to the first possible implementation of the fourth aspect, in an eighth possible implementation of the fourth aspect, if the processing unit implements the first identity authentication by authenticating a fingerprint by using the fingerprint recognition module, the processing unit is further configured to switch the fingerprint recognition module from the second operation mode to the first operation mode after the first time.

With reference to any one of the fourth aspect, or the first to the eighth possible implementations of the fourth aspect, in a ninth possible implementation of the fourth aspect, the triggering an application program includes starting the application program, or performing a function in the application program, or switching the application program from a background to a foreground.

With reference to any one of the fourth aspect, or the first to the eighth possible implementations of the fourth aspect, in a ninth possible implementation of the fourth aspect, after switching the fingerprint recognition module from the first operation mode to the second operation mode, the processing unit waits to receive a request for second identity authentication, and performs identity authentication after receiving the request for the second identity authentication.

According to a fifth aspect, a touchscreen terminal is provided, including a processor, a transceiver, and a memory, where the processor, the transceiver, and the memory are all connected to a bus; and the processor is configured to read a group of programs stored in the memory, so that the touchscreen terminal performs the method according to any one of the first aspect, or the first to the sixth possible implementations of the first aspect, and the method according to any one of the third aspect, or the first to the tenth possible implementations of the third aspect.

In the embodiments of this application, when a fingerprint authentication module is in a disabled state, the fingerprint authentication module receives a touch operation used to trigger an application program. If determining that fingerprint authentication is not required for execution of the application program, the terminal keeps the fingerprint recognition module in a disabled state, and after the application program is executed for specific duration, enables the fingerprint authentication module again to perform the fingerprint authentication. In this way, while security in a process of using the terminal is ensured, power consumption of the fingerprint authentication module is reduced, and a standby time of the terminal is prolonged.

DESCRIPTION OF EMBODIMENTS

To resolve a prior-art problem of large power consumption and a relatively short standby time that are caused because a fingerprint recognition module is always in an enabled state, in embodiments of this application, a terminal disables a fingerprint recognition module while ensuring secure use of a touchscreen terminal, so that power consumption of the fingerprint recognition module is reduced, and a standby time of the terminal is prolonged.

To make the objectives, technical solutions, and advantages of this application clearer, the following further describes this application in detail with reference to the accompanying drawings. The described embodiments are merely a part rather than all of the embodiments of this application. All other embodiments obtained by persons of ordinary skill in the art based on the embodiments of this application without creative efforts shall fall within the protection scope of this application.

It should be noted that the touchscreen terminal used in this application is referred to as a terminal for short below, and the terminal may include but is not limited to a mobile electronic device such as a mobile phone and a tablet computer. A fingerprint recognition method provided in this application may be applied to any biological feature recognition module configured to recognize user identity permission, and is not limited to a fingerprint recognition module. For example, the fingerprint recognition method may be further applied to biological feature recognition modules such as a voiceprint recognition module, a face recognition module, a blood pressure recognition module, a heart rate recognition module, an iris recognition module, and a palm print recognition module. When the fingerprint recognition method is applied to these biological feature recognition modules, an idea of the method provided in this application can be fully applied, and a beneficial effect of prolonging a standby time of the terminal is also brought. The following uses only the fingerprint recognition method as an example for description in this application.

A concept of an application program used in this application may include but is not limited to application software on the terminal, and a specific service, a specific operation, or a specific function in the application software.

Figure 1A:
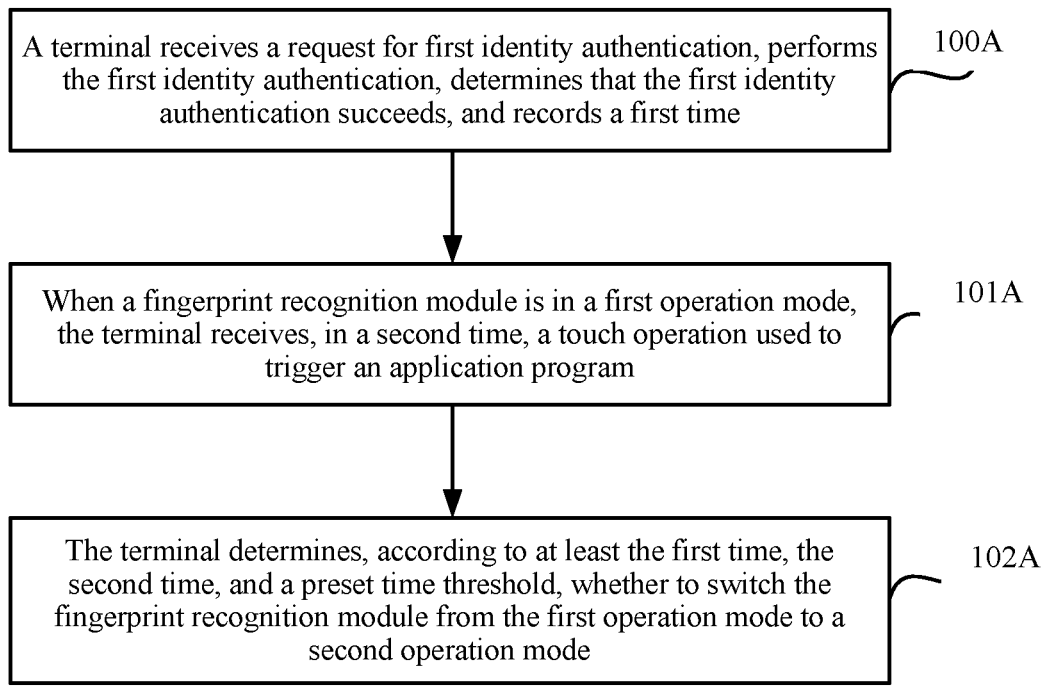
FIG. 1A and FIG. 1B are flowcharts of a fingerprint recognition method according to an embodiment of this application.

Referring to FIG. 1A, an embodiment of this application provides a fingerprint recognition method, and a specific process is as follows.

Step 100A: A terminal receives a request for first identity authentication, performs the first identity authentication, determines that the first identity authentication succeeds, and records a first time.

The first time may be a time of receiving the request for identity authentication or a time of determining that the authentication succeeds. For the foregoing two types of the first time, recording actions are performed at different time. For the time of receiving the request for the identity authentication, a recording action may be performed before the identity authentication is performed, or may be performed after the identity authentication is performed. For the time of determining that the authentication succeeds, a recording action needs to be performed after the authentication succeeds.

Step 101A: When a fingerprint recognition module is in a first operation mode, the terminal receives, in a second time, a touch operation used to trigger an application program.

The triggering an application program includes starting the application program, or performing a function in the application program, or switching the application program from a background to a foreground.

In this application, the fingerprint recognition module has two operation modes. The fingerprint recognition module is in the first operation mode includes but is not limited to, when the fingerprint recognition module is in a fully-disabled state, or in a half-disabled state.

The fully-disabled state means that the fingerprint recognition module cannot be configured to detect a touch operation, or collect or recognize a fingerprint.

The half-disabled state means that the fingerprint recognition module can be configured to detect a touch operation, but cannot be configured to collect or recognize a fingerprint used to perform a touch operation, or means that the fingerprint recognition module can be configured to detect a touch operation, and can also collect and recognize a fingerprint used to perform a touch operation, but in an application process, only detects a touch operation, but does not collect or recognize a fingerprint.

That the fingerprint recognition module is in the second operation mode includes when the fingerprint recognition module at least can be configured to detect and recognize a fingerprint used to perform a touch operation.

In actual application, the fingerprint recognition module is a fingerprint sensor. It is assumed that the fingerprint sensor includes a 200×200 electrode array, can collect all feature point information of a fingerprint, and can match the collected fingerprint with a template in a fingerprint template library locally stored in a terminal. The fingerprint template library herein is a registered fingerprint with operation permission on the terminal.

The fingerprint recognition module is in a fully-disabled state means that the terminal supplies no power to the 200×200 electrode array, and the fingerprint recognition module does not work and cannot detect, collect, and recognize the fingerprint used to perform the touch operation.

That the fingerprint recognition module is in a half-disabled state means that the terminal supplies power only to a 20×20 electrode array in the 200×200 electrode array. In this way, the fingerprint recognition module can detect, only by using the 20×20 electrode array, the touch operation performed by using the fingerprint, but cannot collect or recognize feature point information of the fingerprint used to perform the touch operation.

In addition, the fingerprint recognition module has another operation state. The terminal supplies power to the 200×200 electrode array, so that the fingerprint recognition module can not only detect the touch operation, but also collect and recognize the fingerprint. However, the fingerprint recognition module only detects the touch operation, but does not collect or recognize the fingerprint used for current touching.

Step 102A: The terminal determines, according to at least the first time, the second time, and a preset time threshold, whether to switch the fingerprint recognition module from the first operation mode to a second operation mode.

In the first identity authentication of the terminal, if a fingerprint is authenticated by using the fingerprint recognition module, the fingerprint recognition module is in an enabled state, that is, is in the second operation mode. In this case, the terminal switches the fingerprint recognition module from the second operation mode to the first operation mode after the first time.

That the terminal determines, according to the first time, the second time, and the preset time threshold, whether to switch the fingerprint recognition module from the first operation mode to the second operation mode may include but is not limited to the following manners.

Manner 1: The terminal calculates a time interval between the first time and the second time according to the first time and the second time, and compares the calculated time interval with the preset time threshold; and if the time interval is greater than the preset time threshold, the terminal switches the fingerprint recognition module from the first operation mode to the second operation mode; or if the time interval is not greater than the preset time threshold, the terminal determines to keep the fingerprint recognition module in the first operation mode.

Manner 2: The terminal sets, in the first time, a flag bit used to indicate an authentication success; and in a third time after the first time, the terminal marks the flag bit as a failure, or deletes the flag bit used to indicate an authentication success, where a time interval between the third time and the first time is the preset time threshold.

If the terminal determines that the flag bit is marked as a failure, or determines that the flag bit used to indicate an authentication success is deleted, the terminal determines, in the second time, to switch the fingerprint recognition module from the first operation mode to the second operation mode.

If the terminal determines that there is the flag bit used to indicate an authentication success, the terminal determines, in the second time, to keep the fingerprint recognition module in the first operation mode.

Manner 3: The terminal sets, in the first time, a failure time of a result indicating that the authentication succeeds. The failure time is set according to the first time and the preset time threshold.

If the terminal determines that the second time is after the failure time, the terminal determines, in the second time, to switch the fingerprint recognition module from the first operation mode to the second operation mode.

If the terminal determines that the second time is before the failure time, the terminal determines, in the second time, to keep the fingerprint recognition module in the first operation mode.

In an embodiment, the terminal needs to determine, with reference to another factor in addition to the first time, the second time, and the preset time threshold, whether to switch the fingerprint recognition module from the first operation mode to the second operation mode. This is as follows.

The terminal determines, according to the first time, the second time, and the preset time threshold and with reference to at least one of a preset security level of the application program, an application type of the application program, a parameter carried in a fingerprint authentication request sent by the application program, a use frequency of the application program, an installation time of the application program, or signature information of the application program, whether to switch the fingerprint recognition module from the first operation mode to the second operation mode.

The security level of the application program includes at least a high level, of a high security level, that indicates that fingerprint authentication is required for execution of the application program, and a low level, of a low security level, that indicates that fingerprint authentication is not required for execution of the application program.

For example, the terminal calculates the time interval between the first time and the second time according to the first time and the second time, and compares the calculated time interval with the preset time threshold. If the time interval is not greater than the preset time threshold, and it is determined, with reference to the security level of the application program, that the security level of the application program is a high level, the terminal determines to switch the fingerprint recognition module from the first operation mode to the second operation mode. An idea of performing determining with reference to another factor is the same as that of performing determining with reference to the security level of the application program, and details are not described herein.

A higher use frequency of the application program indicates that the terminal less needs to switch the fingerprint recognition module from the first operation mode to the second operation mode in a determining process. If the installation time of the application program is closer to a current time, the terminal less needs to switch the fingerprint recognition module from the first operation mode to the second operation mode in a determining process. If the signature information of the application program includes information indicating that the terminal is allowed to be securely used, the terminal less needs to switch the fingerprint recognition module from the first operation mode to the second operation mode in a determining process.

In the foregoing process, after switching the fingerprint recognition module from the first operation mode to the second operation mode, the terminal waits to receive a request for second identity authentication, and performs identity authentication after receiving the request for the second identity authentication.

The foregoing related identity authentication may be a password or a personal identification number (PIN) entered by a user, or biological feature parameters such as a fingerprint, a voiceprint, an iris, face recognition, a palm print, and a heart rate, and this is not limited herein.

Figure 1B:
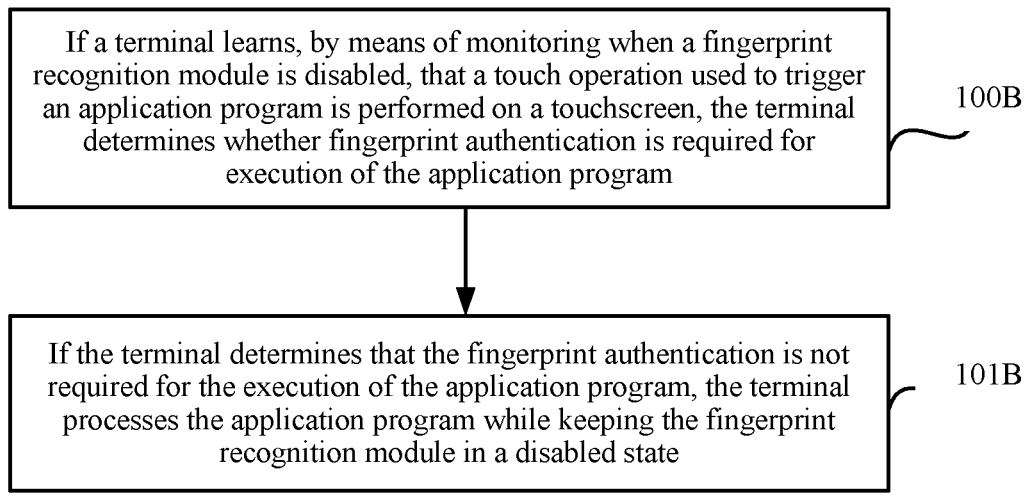

Based on the foregoing embodiment, a fingerprint recognition method provided in an embodiment in this application is described in detail below with reference a specific application scenario. Referring to FIG. 1B, a specific process is as follows.

Step 100B: If a terminal learns, by means of monitoring when a fingerprint recognition module is disabled, that a touch operation used to trigger an application program is performed on a touchscreen, the terminal determines whether fingerprint authentication is required for execution of the application program.

During user registration, the terminal collects a fingerprint of a user, and sets corresponding user identity permission. The fingerprint recognition module is configured to, when the user performs a touch operation, authenticate the user identity permission, that is, authenticate a fingerprint used to perform the touch operation on the touchscreen. In the following description of this embodiment of this application, an expression of fingerprint authentication is equal to an expression of user identity permission authentication.

In this embodiment of this application, the terminal does not always enable the fingerprint recognition module, and disables the fingerprint recognition module when a specific condition is met. For example, a screen unlocking program is usually set on the terminal, and a screen may be unlocked by means of fingerprint recognition. After the screen is unlocked, if the terminal detects, by using a bezel sensor, that the terminal is in contact with the user, that is, the user holds the terminal, the terminal disables the fingerprint recognition module.

When the fingerprint recognition module is disabled, if it is learned by means of monitoring that the touch operation used to trigger the application program is performed on the touchscreen, the application program is not immediately executed, but whether the fingerprint authentication is required for the execution of the application program is first determined. The triggering an application program includes starting an application program or performing an operation in an application program after the application program is started. For example, the triggering an application program may be starting music play software in a mobile phone, or playing or pausing a song after the music play software is started.

The terminal determines, according to the following A and/or B, whether the fingerprint authentication is required for the execution of the application program. The term "and/or" is only an association relationship for describing associated objects and represents that three relationships may exist. A and/or B may represent the following three cases. Only A exists, both A and B exist, and only B exists.

A. The terminal determines, according to a security level of the application program, whether the fingerprint authentication is required for the execution of the application program.

The terminal presets the security level of the application program according to an application type of the application program. The security level that is set for the application program includes but is not limited to two levels such as a high level, of a high security level, that indicates that the fingerprint authentication is required for the execution of the application program, and a low level, of a low security level, that indicates that the fingerprint authentication is not required for the execution of the application program. For example, application types are a film type, a game type, a social type, and a financial type. Application programs of a film type, a game type, and a social type are set to a low level, and an application program of a financial type is set to a high level.

B. The terminal determines, according to a parameter carried in a received fingerprint authentication request sent by the application program, whether the fingerprint authentication is required for the execution of the application program.

In some application programs, there are both an operation of a high security level and an operation of a low security level. In an execution process of the application program, for the operation of a high security level, the application program actively sends, to the terminal, a fingerprint authentication request that carries a parameter, and the carried parameter is used to determine whether fingerprint authentication is required for execution of the application program.

For example, in a social application program, the social application program includes both an operation related only to chatting and an operation related to money transaction. For an operation related to money transaction such as payment and transfer, the application program actively sends, to the terminal, a fingerprint authentication request that carries a parameter, and the terminal determines, according to the carried parameter, whether the fingerprint authentication is required for the execution of the application program.

Step 101B: When the terminal determines that the fingerprint authentication is not required for the execution of the application program, the terminal processes the application program while keeping the fingerprint recognition module in a disabled state.

If the terminal determines, according to the method A, that the security level of the application program is a low level, the terminal determines that the fingerprint authentication is not required for the execution of the application program.

When performing determining according to the method B, the terminal determines, according to the parameter carried in the received fingerprint authentication request sent by the application program, that the fingerprint authentication is not required for the execution of the application program; or determines that the fingerprint authentication is not required for the execution of the application program when determining, according to the parameter carried in the received fingerprint authentication request sent by the application program, that the fingerprint authentication is required for the execution of the application program, and that a retained result of latest fingerprint authentication is a success and duration between a moment at which the latest fingerprint authentication is performed and a current moment is in a preset duration range. Each time the terminal performs a fingerprint authentication operation, the terminal stores a fingerprint authentication result. When the application program is allowed to use the result of the latest fingerprint authentication, and the terminal reads the retained result of the latest fingerprint authentication and determines that the retained result of the latest fingerprint authentication is a success and the duration between the moment at which the latest fingerprint authentication is performed and the current moment does not exceed the preset duration range, the terminal determines that the fingerprint authentication is not required for the execution of the application program.

Further, in the execution process of the application program, to ensure use security of the terminal, the fingerprint recognition module is not always kept in a disabled state. In this embodiment of this application, a specific time threshold may be set according to an attribute of the application program. When the time of processing the application program exceeds the corresponding time threshold, that is, after the application program has been processed for specified duration, the fingerprint recognition module is enabled to authenticate the fingerprint used to perform the touch operation. For example, for the application program of a financial type, a relatively small time threshold may be set, for example, 2 minutes. For the application program of a film type, a relatively large time threshold may be set, for example, 45 minutes. After it is determined that the authentication succeeds, the fingerprint recognition module is disabled. After the fingerprint recognition module is enabled, and before fingerprint recognition is performed, if no fingerprint is collected, the terminal keeps the fingerprint recognition module in an enabled state until a fingerprint is collected.

In addition, when determining that the fingerprint authentication is required for the execution of the application program, the terminal enables the fingerprint recognition module to authenticate the fingerprint used to perform the touch operation, and after it is determined that the authentication succeeds, processes the application program, and disables the fingerprint recognition module.

If the terminal determines, according to the method A, that the security level of the application program is a high level, the terminal determines that the fingerprint authentication is required for the execution of the application program.

When performing determining according to the method B, the terminal determines, according to the parameter carried in the received fingerprint authentication request sent by the application program, that the fingerprint authentication is required for the execution of the application program.

The fingerprint recognition method in the embodiment of this application is described in detail below according to the method A and the method B and with reference to specific application scenarios.

Figure 2:
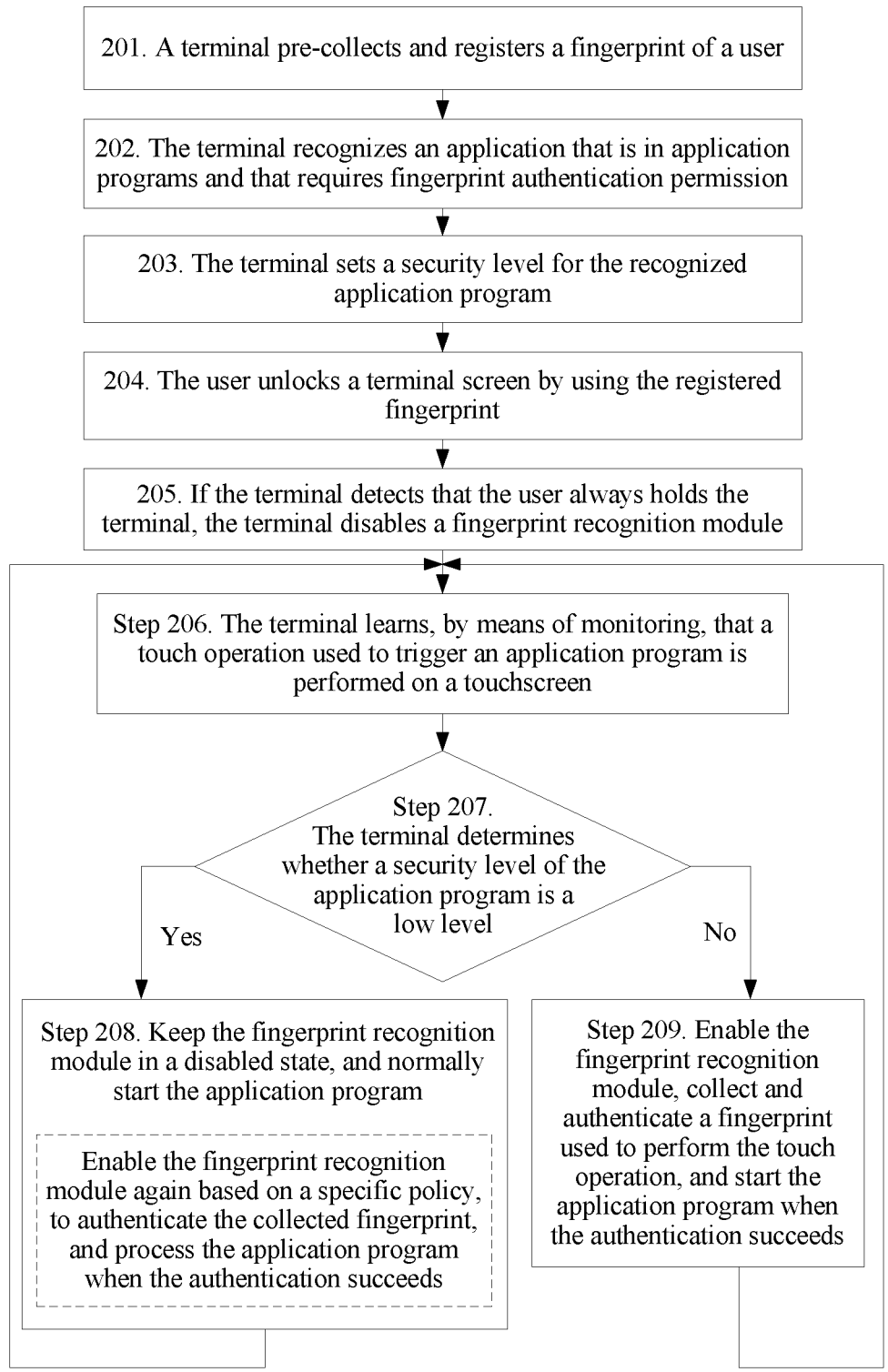
FIG. 2 is a flowchart of a first example of a fingerprint recognition method according to an embodiment of this application.

Referring to FIG. 2, a process of a first example of the fingerprint recognition method is as follows.

Step 201: A terminal pre-collects and registers a fingerprint of a user.

A fingerprint registration module of the terminal collects the fingerprint of the user, saves and records the collected fingerprint of the user, and establishes an association relationship between the saved fingerprint and corresponding permission.

Step 202: The terminal recognizes an application that is in application programs and that requires fingerprint authentication permission.

The terminal determines all local application programs, and recognizes an application program for which a fingerprint recognition module needs to be used.

Step 203: The terminal sets a security level for the recognized application program.

At least two security levels are set. For example, a high level, of a high security level, that indicates that fingerprint authentication is required for execution of the application program, and a low level, of a low security level, that indicates that fingerprint authentication is not required for execution of the application program.

Step 204: In a standby state, unlock a terminal screen by using the registered fingerprint.

In this case, the fingerprint recognition module is enabled. When the fingerprint recognition module authenticates a detected fingerprint used to perform a touch operation, and after the authentication succeeds, the terminal screen is unlocked.

Step 205: After the screen is unlocked, if the terminal detects, by using a frame sensor or the like, that the terminal is in contact with the user, that is, the user holds the terminal, the terminal disables a fingerprint recognition module.

A method for detecting that the user holds the terminal is not limited in this embodiment of this application.

Step 206: The terminal learns, by means of monitoring, that a touch operation used to trigger an application program is performed on a touchscreen.

Step 207: The terminal determines whether a security level of the application program is a low level. If yes, step 208 is performed, or otherwise, step 209 is performed.

Step 208: Keep the fingerprint recognition module in a disabled state, normally start the application program, and return to perform step 206.

In a process of performing step 208, the terminal does not always keep the fingerprint recognition module in a disabled state, but enables the fingerprint recognition module again based on a specific policy, authenticates the collected fingerprint, and processes the application program when the authentication succeeds.

A specific policy is described in step 101B, and repeated descriptions are not further provided.

Step 209: Enable the fingerprint recognition module, collect and authenticate a fingerprint used to perform the touch operation, start the application program when the authentication succeeds, and return to perform step 206.

Figure 3:
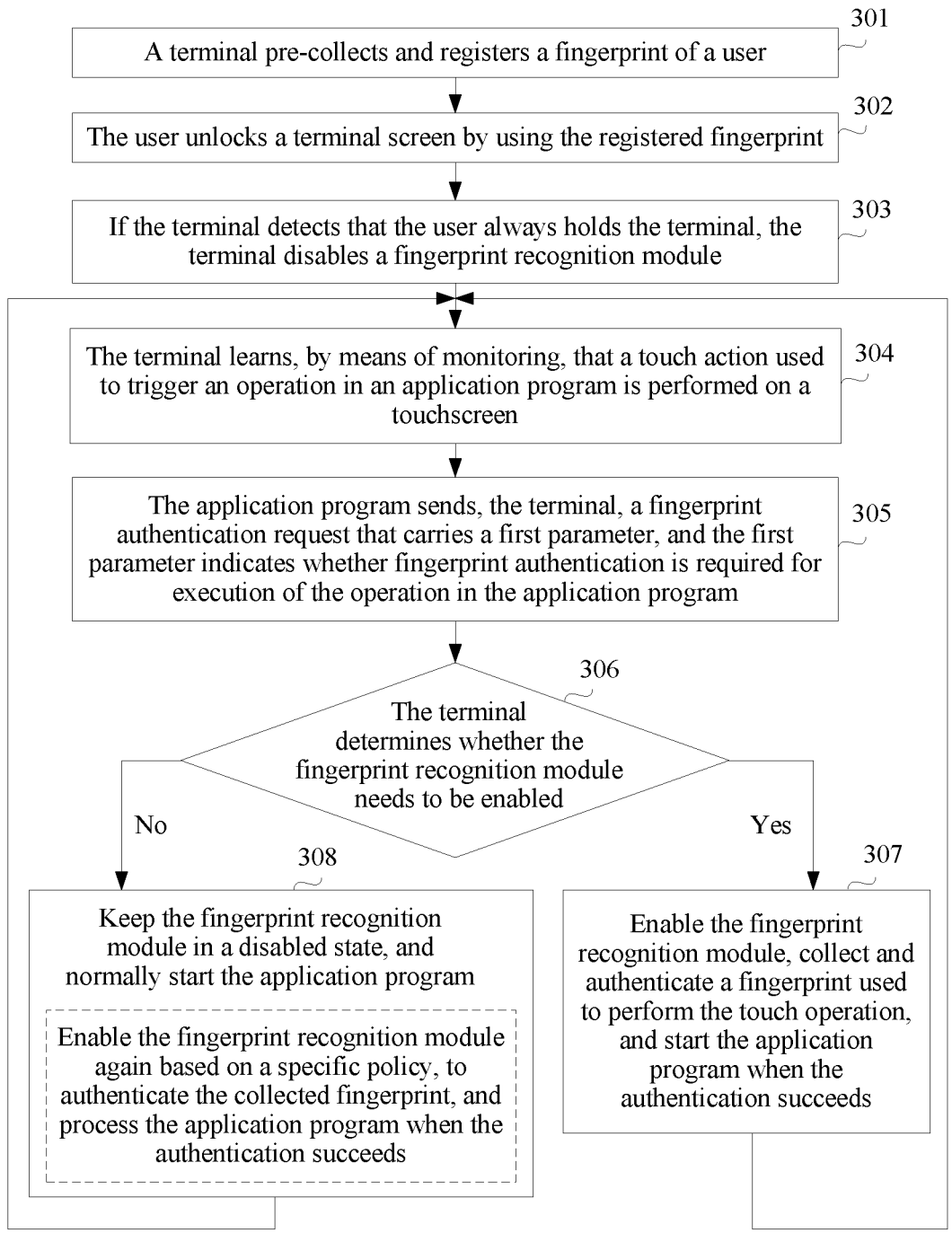
FIG. 3 is a flowchart of a second example of a fingerprint recognition method according to an embodiment of this application.

Referring to FIG. 3, a process of a second example of the fingerprint recognition method is as follows.

Step 301: A terminal pre-collects and registers a fingerprint of a user.

Step 302: In a standby state, unlock a terminal screen by using the registered fingerprint.

Step 303: After the screen is unlocked, if the terminal detects, by using a frame sensor or the like, that the terminal is in contact with the user, that is, the user holds the terminal, the terminal disables a fingerprint recognition module.

Step 301 to step 303 are the same as step 201, step 204, and step 205, and repeated descriptions are not further provided.

Step 304: The terminal learns, by means of monitoring, that a touch action used to trigger an operation (may be a service or a function) in an application program is performed on a touchscreen.

Step 305: The application program sends, to the terminal, a fingerprint authentication request that carries a first parameter, and the first parameter indicates whether fingerprint authentication is required for execution of the operation in the application program.

Step 306: The terminal determines, according to the parameter in the received fingerprint authentication request sent by the application program, whether the fingerprint recognition module needs to be enabled. If yes, step 307 is performed, or otherwise, step 308 is performed.

Step 307 is the same as step 209, step 308 is the same as step 208, and repeated descriptions are not further provided. After step 307 is performed and after step 308 is performed, the terminal returns to perform step 204.

Figure 4A:
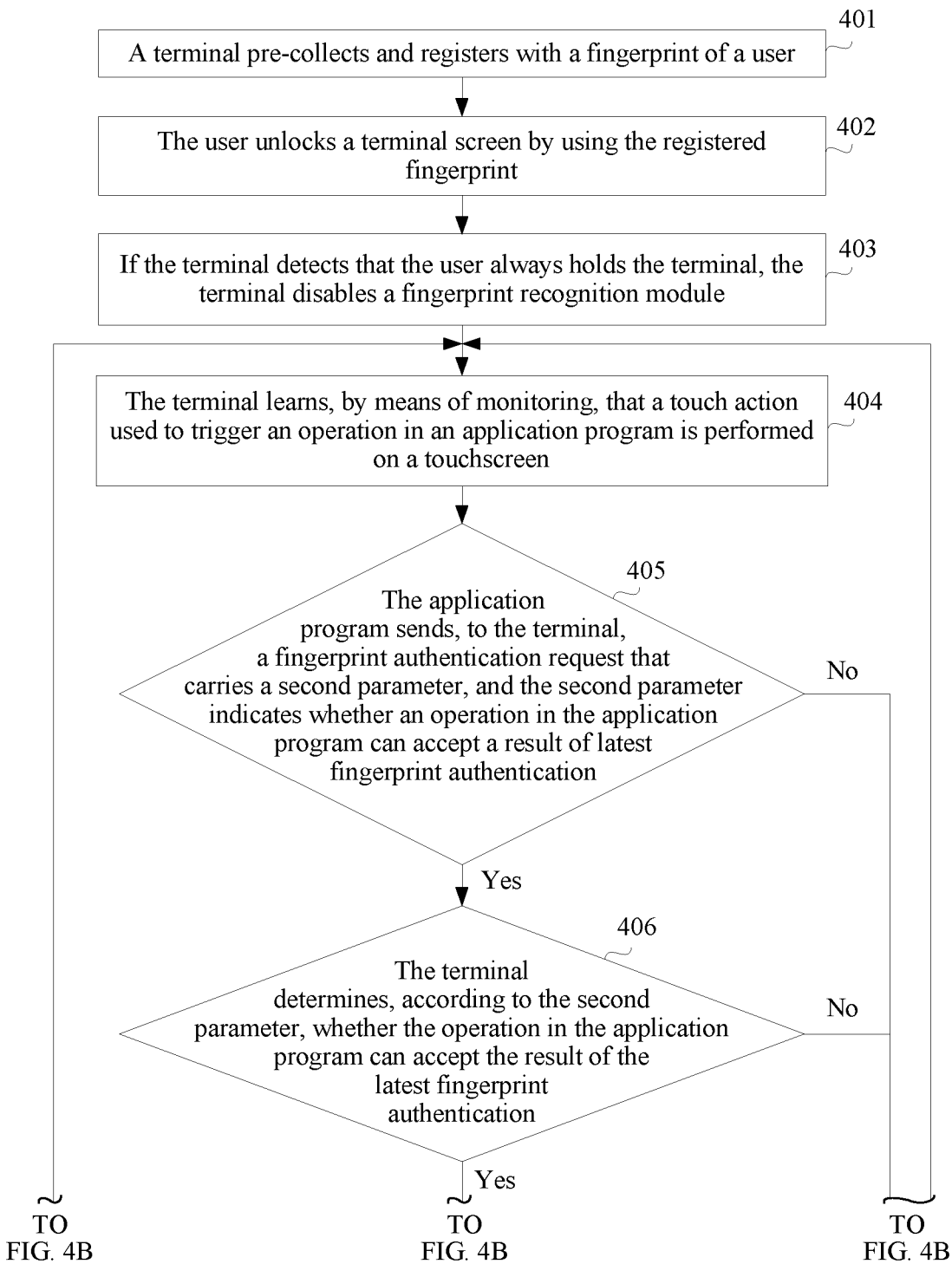
FIG. 4A and FIG. 4B are a flowchart of a third example of a fingerprint recognition method according to an embodiment of this application.
Figure 4B:
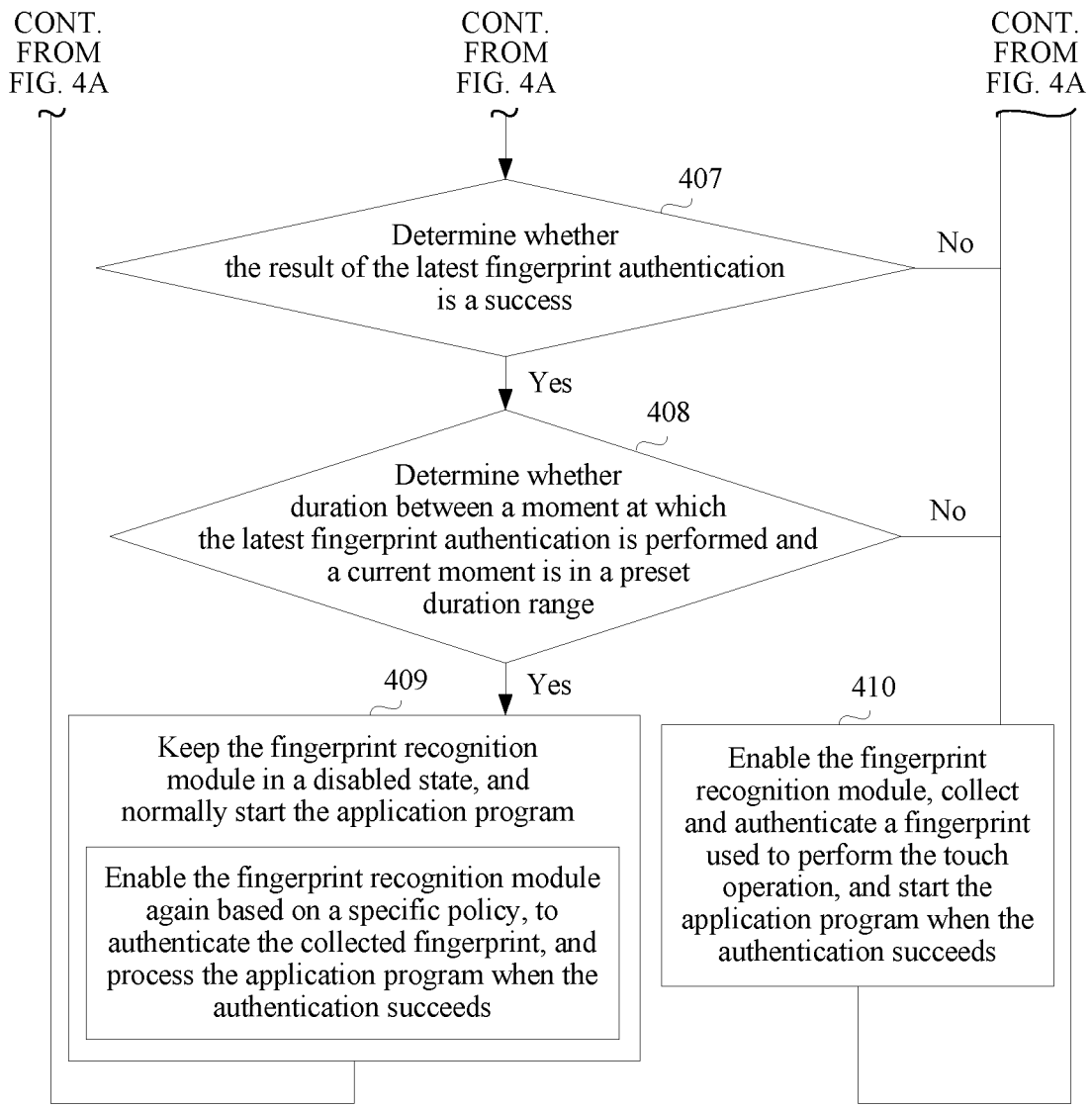

Based on the second example of the fingerprint recognition method, referring to FIG. 4A and FIG. 4B, a process of a third example of the fingerprint recognition method is as follows.

Step 401 to step 404 are the same as step 301 to step 304, and details are not described herein again.

Step 405: The application program sends, to the terminal, a fingerprint authentication request that carries a second parameter, and the second parameter indicates whether an operation in the application program can accept a result of latest fingerprint authentication. If yes, step 406 is performed, or otherwise, step 410 is performed.

Step 406: The terminal determines, according to the second parameter, whether the operation in the application program can accept the result of the latest fingerprint authentication. If yes, step 407 is performed, or otherwise, step 410 is performed.

Step 407: Determine whether the result of the latest fingerprint authentication is a success. If yes, step 408 is performed, or otherwise, step 410 is performed.

Step 408: Determine whether duration between a moment at which the latest fingerprint authentication is performed and a current moment is in a preset duration range. If yes, step 409 is performed, or otherwise, step 410 is performed.

Step 409: Normally start the operation in the application program, and return to perform step 404.

Step 410: Enable the fingerprint recognition module, collect and authenticate a fingerprint used to perform the touch operation, start the application program when the authentication succeeds, and return to perform step 404.

Step 409 and step 410 are the same as step 308 and step 307, and repeated descriptions are not further provided.

Figure 5:
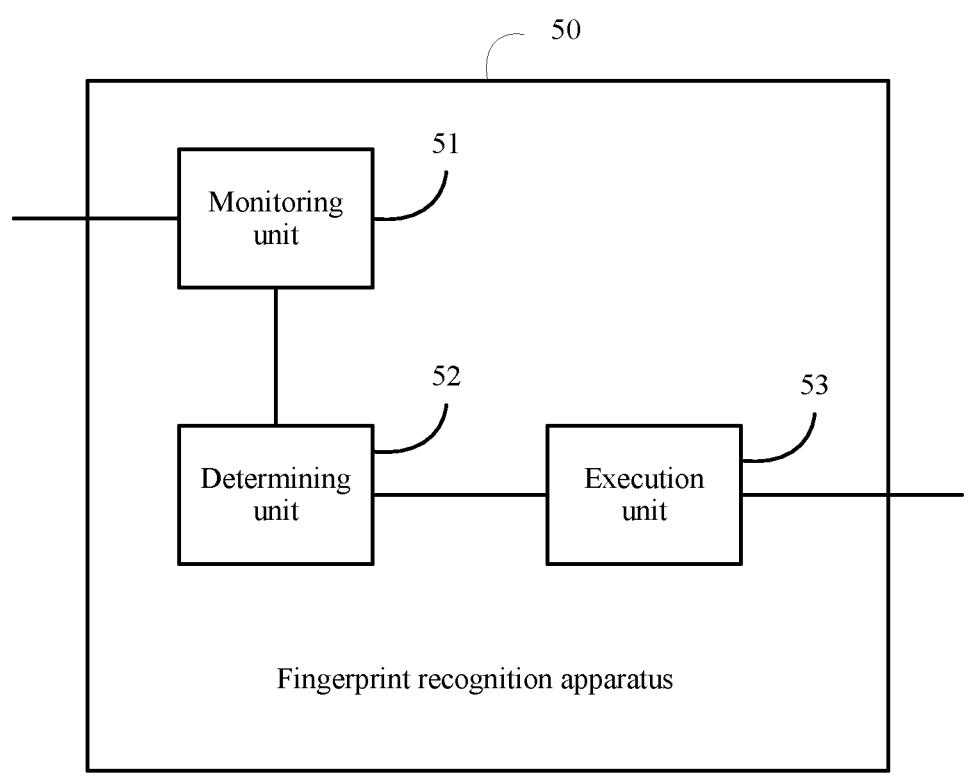
FIG. 5 and FIG. 6 are structural diagrams of fingerprint recognition apparatuses according to an embodiment of this application.

Based on the foregoing embodiments, referring to FIG. 5, an embodiment of this application further provides a fingerprint recognition apparatus 50 that includes a monitoring unit 51, a determining unit 52, and an execution unit 53.

The monitoring unit 51 is configured to monitor, when a fingerprint recognition module is disabled, a touch operation performed on a touchscreen.

The determining unit 52 is configured to, if the monitoring unit 51 detects that a touch operation used to trigger an application program is performed on the touchscreen, determine whether fingerprint authentication is required for execution of the application program. The fingerprint recognition module is configured to authenticate a fingerprint used to perform the touch operation on the touchscreen.

The execution unit 53 is configured to, when the determining unit 52 determines that the fingerprint authentication is not required for the execution of the application program, process the application program while keeping the fingerprint recognition module in a disabled state.

In an embodiment, the execution unit 53 is further configured to, after the application program has been processed for specified duration, enable the fingerprint recognition module, to authenticate the fingerprint used to perform the touch operation; and after it is determined that the authentication succeeds, disable the fingerprint recognition module.

In an embodiment, the execution unit 53 is configured to, after the fingerprint recognition module is enabled, and before fingerprint recognition is performed, if no fingerprint is collected, keep the fingerprint recognition module in an enabled state until a fingerprint is collected.

In an embodiment, the determining unit 52 is configured to determine, according to a security level of the application program, whether the fingerprint authentication is required for the execution of the application program.

In an embodiment, the determining unit 52 is configured to determine, according to a parameter carried in a received fingerprint authentication request sent by the application program, whether the fingerprint authentication is required for the execution of the application program.

In an embodiment, the determining unit 52 is configured to determine, according to the parameter carried in the received fingerprint authentication request sent by the application program, that the fingerprint authentication is not required for the execution of the application program; or determine that the fingerprint authentication is not required for the execution of the application program when determining, according to the parameter carried in the received fingerprint authentication request sent by the application program, that the fingerprint authentication is required for the execution of the application program, and that a retained result of latest fingerprint authentication is a success, and duration between a moment at which the latest fingerprint authentication is performed and a current moment is in a preset duration range.

In an embodiment, the execution unit 53 is further configured to, when the determining unit 52 determines that the fingerprint authentication is required for the execution of the application program, enable the fingerprint recognition module, to authenticate the fingerprint used to perform the touch operation; and after it is determined that the authentication succeeds, process the application program, and disable the fingerprint recognition module.

Figure 6:
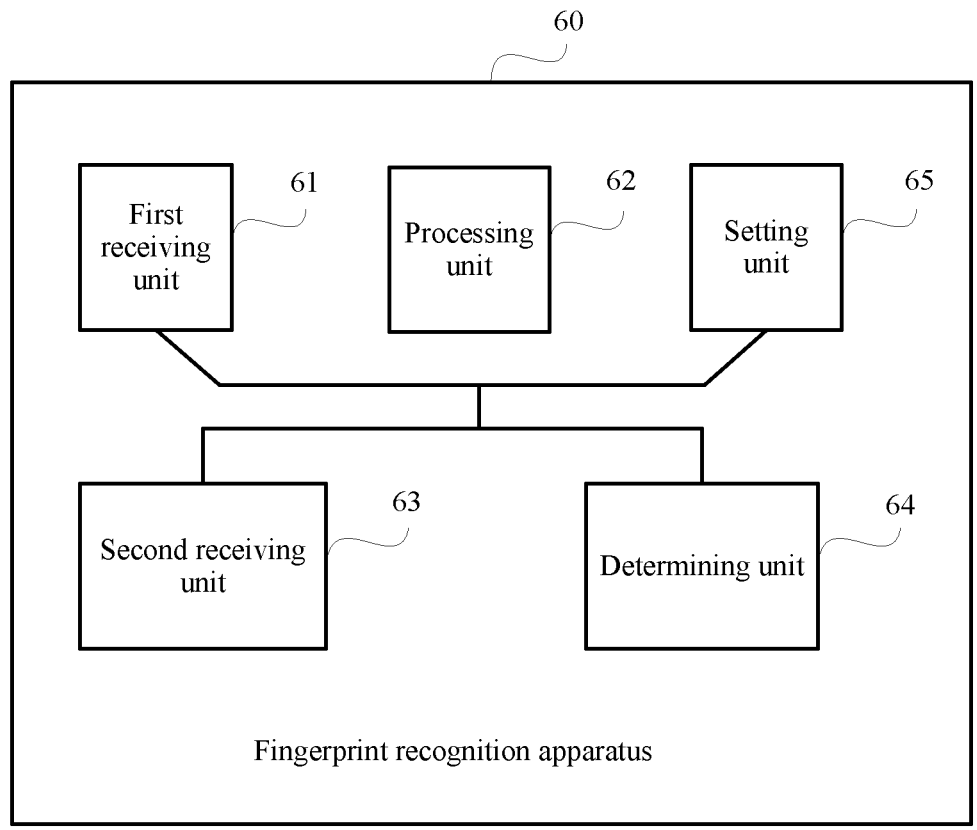

Based on the foregoing embodiments, referring to FIG. 6, an embodiment of this application further provides another fingerprint recognition apparatus 60 that is applied to a terminal and includes a first receiving unit 61 configured to receive a request for first identity authentication; a processing unit 62 configured to perform the first identity authentication on the request for the first identity authentication received by the first receiving unit 61, determine that the identity authentication succeeds, and record a first time; a second receiving unit 63 configured to, when a fingerprint recognition module is in a first operation mode, receive, in a second time, a touch operation used to trigger an application program; and a determining module 64 configured to determine, according to at least the first time, the second time, and a preset time threshold, whether to switch the fingerprint recognition module from the first operation mode to a second operation mode.

In an embodiment, when the fingerprint recognition module is in the first operation mode, the fingerprint recognition module is in a fully-disabled state, or in a half-disabled state, where the half-disabled state means that the fingerprint recognition module can be configured to detect a fingerprint used to perform a touch operation, but cannot be configured to recognize the fingerprint used to perform the touch operation.

When the fingerprint recognition module is in the second operation mode, the fingerprint recognition module at least can be configured to detect and recognize a fingerprint used to perform a touch operation.

In an embodiment, the determining unit 64 is configured to calculate a time interval between the first time and the second time according to the first time and the second time; compare the calculated time interval with the preset time threshold; and if the time interval is greater than the preset time threshold, determine to switch the fingerprint recognition module from the first operation mode to the second operation mode; or if the time interval is not greater than the preset time threshold, determine to keep the fingerprint recognition module in the first operation mode.

In an embodiment, the apparatus further includes a setting unit 65.

The setting unit 65 is configured to set, in the first time, a flag bit used to indicate an authentication success; and in a third time after the first time, mark the flag bit as a failure, or delete the flag bit used to indicate an authentication success, where a time interval between the third time and the first time is the preset time threshold.

In an embodiment, the determining unit 64 is configured to, if it is determined that the flag bit is marked as a failure, or if it is determined that the flag bit used to indicate an authentication success is deleted, determine, in the second time, to switch the fingerprint recognition module from the first operation mode to the second operation mode; or if it is determined that there is the flag bit used to indicate an authentication success, determine, in the second time, to keep the fingerprint recognition module in the first operation mode.

In an embodiment, the determining unit 65 is further configured to set, in the first time, a failure time of a result indicating that the authentication succeeds.

The failure time is set according to the first time and the preset time threshold.

In an embodiment, the determining unit 64 is configured to, if it is determined that the second time is after the failure time, determine, in the second time, to switch the fingerprint recognition module from the first operation mode to the second operation mode; or if it is determined that the second time is before the failure time, determine, in the second time, to keep the fingerprint recognition module in the first operation mode.

In an embodiment, the determining unit 64 is configured to determine, according to the first time, the second time, and the preset time threshold and with reference to a preset security level of the application program, an application type of the application program, a parameter carried in a fingerprint authentication request sent by the application program, a use frequency of the application program, an installation time of the application program, or signature information of the application program, whether to switch the fingerprint recognition module from the first operation mode to the second operation mode.

In an embodiment, if the processing unit 62 performs fingerprint authentication implements the first identity authentication by authenticating the authenticated fingerprint by using the fingerprint recognition module, the processing unit 62 is further configured to switch the fingerprint recognition module from the second operation mode to the first operation mode after the first time.

In an embodiment, the triggering an application program includes starting the application program, or performing a function in the application program, or switching the application program from a background to a foreground.

In an embodiment, after switching the fingerprint recognition module from the first operation mode to the second operation mode, the processing unit 62 waits to receive a request for second identity authentication, and performs identity authentication after receiving the request for the second identity authentication.

Figure 7:
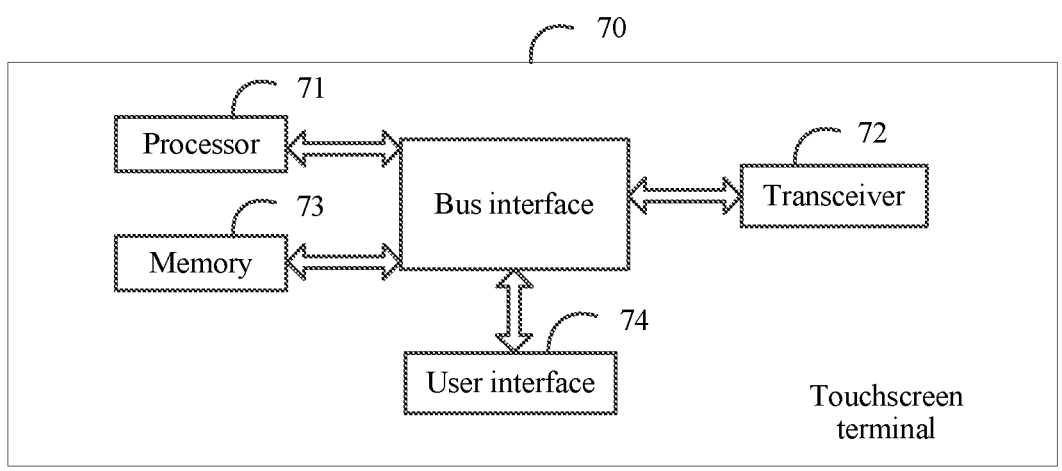
FIG. 7 is a structural diagram of a touchscreen terminal according to an embodiment of this application.

Based on the foregoing embodiments, referring to FIG. 7, an embodiment of this application further provides a touchscreen terminal 70 that includes a processor 71, a transceiver 72, and a memory 73. The processor 71, the transceiver 72, and the memory 73 are all connected to a bus.

The processor 71 is configured to read a group of programs stored in the memory 73, so that the touchscreen terminal 70 performs the fingerprint recognition method provided in the embodiments of this application.

In FIG. 7, a bus architecture may include any quantity of interconnected buses and bridges that are interconnected by various circuits of one or more processors represented by the processor 71 and a memory represented by a memory 73. The bus architecture may further link various other circuits such as a peripheral device, a voltage regulator, and a power management circuit. This is well known in the art, and therefore, this specification provides no further description. A bus interface provides an interface. The transceiver 72 may be multiple components, that is, the transceiver 72 includes a transmitter and a receiver, and provides a unit that is configured to communicate with various other apparatuses on a transmission medium. For different user equipments, a user interface 74 may further be an interface that can be externally connected to a device. The connected device includes but is not limited to a keypad, a display, a loudspeaker, a microphone, a joystick, and the like.

The processor 71 is responsible for bus architecture management and general processing. The memory 73 may store data used when the processor 71 performs an operation.

In conclusion, in this embodiment of this application, when a fingerprint authentication module is in a disabled state, a touch operation used to trigger an application program is received. If it is determined that fingerprint authentication is not required for execution of the application program, the fingerprint recognition module is kept in a disabled state, and after the application program has been executed for specific duration, the fingerprint authentication module is enabled again, to perform the fingerprint authentication. In this way, while security in a process of using the terminal is ensured, power consumption of the fingerprint authentication module is reduced, and a standby time of the terminal is prolonged.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disk read-only memory (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or on another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of the disclosure. This application is intended to cover these modifications and variations provided that they fall within the scope of protection defined by the following claims and their equivalent technologies.

The invention claimed is:

1. A method, comprising:
performing a first user authentication for unlocking a touch screen of an electronic device;
recording a first time when the first user authentication succeeds;
detecting a first input for executing an application program when the touch screen is unlocked, wherein the application program is configured to require a second user authentication for executing the application program, and wherein the first input is detected at a second time after the first time;
comparing a time interval between the first time and the second time with a preset time threshold to detect whether the time interval is less than the preset time threshold or the time interval is greater than the preset time threshold;
starting the application program without performing the second user authentication when the time interval is less than the preset time threshold and the first user authentication succeeds; and
locking the application program and requiring the second user authentication to start the application program when the time interval is greater than the preset time threshold.

2. The method of claim 1, wherein performing the first user authentication and performing the second user authentication comprise performing fingerprint authentications.

3. The method of claim 2, wherein the electronic device comprises a mobile phone with a fingerprint sensor located underneath the touch screen, and wherein the method further comprises performing the fingerprint authentications using the fingerprint sensor.

4. The method of claim 3, further comprising:
disabling the fingerprint sensor when the first user authentication succeeds; and
enabling the fingerprint sensor when the time interval is greater than the preset time threshold.

5. The method of claim 3, further comprising disabling the fingerprint sensor when the electronic device stays in contact with a user after the touch screen is unlocked.

6. The method of claim 1, wherein the first time includes a third time of receiving a request for the first user authentication or a fourth time after receiving the request for the first user authentication.

7. An apparatus, comprising:
a touch screen;
a fingerprint sensor;
a memory configured to store instructions; and
one or more processors coupled to the touch screen, the fingerprint sensor, and the memory, wherein the instructions, when executed by the one or more processors, cause the apparatus to:
- perform a first user authentication for unlocking the touch screen;
- record a first time when the first user authentication succeeds;
- detect a first input for executing an application program when the touch screen is unlocked, wherein the application program is configured to require a second user authentication for executing the application program, and wherein the first input is detected at a second time after the first time;
- compare a time interval between the first time and the second time with a preset time threshold to detect whether the time interval is less than the preset time threshold or the time interval is greater than the preset time threshold;
- start the application program without performing the second user authentication when the time interval is less than the preset time threshold and the first user authentication succeeds; and
- lock the application program and require the second user authentication to start the application program when the time interval is greater than the preset time threshold.

8. The apparatus of claim 7, wherein the instructions further cause the apparatus to perform the first user authentication and the second user authentication by performing fingerprint authentications.

9. The apparatus of claim 8, wherein the fingerprint sensor is located underneath the touch screen, and wherein the instructions further cause the apparatus to perform the fingerprint authentications using the fingerprint sensor.

10. The apparatus of claim 7, wherein the instructions further cause the apparatus to:
- disable the fingerprint sensor when the first user authentication succeeds; and
- enable the fingerprint sensor when the time interval is greater than the preset time threshold.

11. The apparatus of claim 7, wherein the first time includes a third time of receiving a request for the first user authentication or a fourth time after receiving the request for the first user authentication.

12. The apparatus of claim 7, wherein the instructions further cause the apparatus to disable the fingerprint sensor when the apparatus stays in contact with a user after the touch screen is unlocked.

13. The apparatus of claim 7, wherein the instructions further cause the apparatus to:
- locally store the application program within the memory of the apparatus; and
- start the application program from the memory of the apparatus.

14. The apparatus of claim 7, wherein the instructions further cause the apparatus to receive a user setting of requiring or not requiring the second user authentication for executing the application program.

15. A computer program product comprising computer-executable instructions stored on a non-transitory computer-readable medium that, when executed by one or more processors, cause an apparatus to:
- perform a first user authentication for unlocking a touch screen of the apparatus;
- record a first time when the first user authentication succeeds;
- detect a first input for executing an application program when the touch screen is unlocked, wherein the application program is configured to require a second user authentication for executing the application program, and wherein the first input is detected at a second time after the first time;
- compare a time interval between the first time and the second time with a preset time threshold to detect whether the time interval is less than the preset time threshold or the time interval is greater than the preset time threshold;
- lock the application program and require perform the second user authentication to start the application program when the time interval is greater than the preset time threshold; and
- start the application program without performing the second user authentication when the time interval is less than the preset time threshold and the first user authentication succeeds.

16. The computer program product of claim 15, wherein the instructions further cause the apparatus to perform the first user authentication and perform the second user authentication by performing fingerprint authentications.

17. The computer program product of claim 16, wherein the apparatus comprises a mobile phone with a fingerprint sensor located underneath the touch screen, and wherein the instructions further cause the apparatus to perform the fingerprint authentications using the fingerprint sensor.

18. The computer program product of claim 17, wherein the instructions further cause the apparatus to:
- disable the fingerprint sensor when the first user authentication succeeds; and
- enable the fingerprint sensor when the time interval is greater than the preset time threshold.

19. The computer program product of claim 17, wherein the instructions further cause the apparatus to disable the fingerprint sensor when the apparatus stays in contact with a user after the touch screen is unlocked.

20. The computer program product of claim 15, wherein the first time includes a third time of receiving a request for the first user authentication or a fourth time after receiving the request for the first user authentication.

* * * * *

UNITED STATES PATENT AND TRADEMARK OFFICE
CERTIFICATE OF CORRECTION

PATENT NO. : 11,914,693 B2
APPLICATION NO. : 17/335843
DATED : February 27, 2024
INVENTOR(S) : Jiejing Huang and Huangwei Wu It is certified that error appears in the above-identified patent and that said Letters Patent is hereby corrected as shown below:

In the Claims

Claim 15, Column 22, Line 26: "require perform the" should read "require the"

Signed and Sealed this
Second Day of April, 2024

Katherine Kelly Vidal
Director of the United States Patent and Trademark Office